United States Patent
Zajaczkowski

[11] Patent Number: 5,929,182
[45] Date of Patent: Jul. 27, 1999

[54] HETEROCYCLIC MACROMERS

[75] Inventor: Michael J. Zajaczkowski, York, Pa.

[73] Assignee: Adhesives Research, Inc., Glen Rock, Pa.

[21] Appl. No.: 08/821,725

[22] Filed: Mar. 20, 1997

[51] Int. Cl.[6] .............................. C08F 34/04; C08F 26/06; C08F 34/02; C08F 495/22
[52] U.S. Cl. .......................... 526/256; 526/263; 526/266; 549/41; 549/543; 548/416
[58] Field of Search ...................................... 526/256, 263, 526/266; 548/416; 549/263, 266

[56] References Cited

U.S. PATENT DOCUMENTS

| | | |
|---|---|---|
| 4,764,573 | 8/1988 | Myers . |
| 4,900,782 | 2/1990 | Han et al. . |
| 4,959,430 | 9/1990 | Jonas et al. . |
| 5,035,926 | 7/1991 | Jonas et al. . |
| 5,111,327 | 5/1992 | Blohm et al. . |
| 5,331,056 | 7/1994 | Pecate et al. . |
| 5,385,956 | 1/1995 | Schellekens et al. . |
| 5,407,699 | 4/1995 | Myers . |
| 5,430,073 | 7/1995 | Van Dijk et al. . |
| 5,432,237 | 7/1995 | Otsuka et al. ..................... 525/284 |
| 5,540,999 | 7/1996 | Yamamoto et al. . |
| 5,637,652 | 6/1997 | Kato et al. . |
| 5,648,453 | 7/1997 | Saida et al. . |
| 5,688,873 | 11/1997 | Saida et al. . |

FOREIGN PATENT DOCUMENTS

| | | |
|---|---|---|
| 652242 | 5/1995 | European Pat. Off. . |
| 4-108784 | 4/1992 | Japan . |

*Primary Examiner*—Jeffrey T. Smith
*Assistant Examiner*—Wu C. Cheng

[57] ABSTRACT

Novel sulfur, oxygen and nitrogen-containing heterocyclic monomers are provided which may be used to produce conductive graft copolymers.

27 Claims, No Drawings

HETEROCYCLIC MACROMERS

BACKGROUND OF THE PRESENT INVENTION

The present invention is directed to novel sulfur, nitrogen or oxygen-containing heterocyclic macromers.

In the past, the practical use of copolymers with electrical conductivity has generally been limited to non-pressure sensitive adhesives. Generally, the conductive fillers used to impart conductivity are impractical for most adhesive-based applications either because they are prohibitively expensive (such as gold and silver) or they possess oil absorption characteristics that adversely affect the physical properties of the pressure-sensitive adhesive (PSA).

Various methods are known to impart conductivity to copolymers, including doping or the addition of conductive fillers.

It is known to add conductive blacks (i.e., carbon) to normally non-conductive PSA's, with the electrical properties of the PSA improving with the degree of carbon loading. See, for example, U.S. Pat. No. 3,778,306 which provides for the presence of between about 20–43 percent by weight of carbon in a pressure sensitive adhesive. However, at loadings high enough to provide good conductivity, a reduction in physical performance of the PSA characteristically results, affecting physical properties such as tack, peel, and shear. In the PSA formulation disclosed in the patent, loss of tack due to the presence of large amounts of conductive carbon is compensated for by the addition of a tackifying or plasticizing agent to the formulation and milling the rubber to effect softness.

Loss of adhesive tack is also recognized as a potential problem with respect to electrically-conductive pressure sensitive adhesives in U.S. Pat. No. 2,670,306. In this patent, the use of powdered graphite is stated to be preferred over carbon black to minimize the degree of tack loss.

U.S. Pat. No. 3,475,213 discloses an electrically-conductive adhesive tape which comprises a pressure sensitive adhesive and electrically-conductive particles distributed as a monolayer in the adhesive layer. U.S. Pat. No. 2,808,352 discloses an electrically conductive adhesive tape wherein the adhesive base is impregnated with finely divided silver particles. U.S. Pat. No. 4,367,745 discloses a conformable electrically conductive composition composed of a plurality of deformable, non-polar microspheres around which are dispersed electrically conductive particles. U.S. Pat. No. 4,548,862 is directed to a flexible tape having bridges of electrically conductive particles extending through the adhesive layer. The particles have ferromagnetic cores which by magnetic attraction can serve to form the requisite bridges. U.S. Pat. No. 4,588,762 discloses a pressure sensitive adhesive composition consisting of both a viscoelastic polymeric adhesive phase and an electrically conductive aqueous phase containing a water receptive polymer, a humectant, and an electrolyte.

It would be desirable to provide a macromeric graft moiety which can be used to impart electrically-conductive properties to a copolymer without the need for the use of conductive fillers or for doping the copolymer with an electrically-conductive liquid phase.

It is known to provide electrically-conductive polymers by inclusion within the polymer of a monomer which serves to impart electrical conductivity to the polymer. Exemplary of such monomers are heterocyclic compounds containing such as oxygen, sulfur or nitrogen-containing monomers. In particular, thiophene-based monomers have been found to be particularly useful in imparting electrical conductivity to the polymer. See, for example, U.S. Pat. Nos. 4,900,782; 4,959,430; 5,035,926; 5,111,327; 5,331,056; 5,385,956; 5,430,073; 5,432,237; and EP 652,242.

OBJECTS AND SUMMARY OF THE PRESENT INVENTION

It is accordingly an object of the present invention to provide a novel macromer containing oxygen, sulfur or nitrogen heterocyclic moieties.

It is also an object of the present invention to provide a macromer which may be used to form electrically conductive films or coatings.

It is also an object of the present invention to provide novel heterocyclic macromers which may be used to form an electrically conductive copolymer.

It is also an object of the present invention to provide novel heterocyclic moieties which may be used to form an electrically conductive adhesive.

In accordance with a first embodiment of the present invention, there is provided a heterocyclic macromer I having the formula X—(Y)$_m$—Z—R wherein X is an unsaturated polymerizable moiety, Y is a divalent linking group, R is a terminal group and Z is a moiety

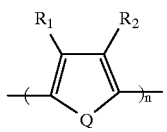

wherein Q is an oxygen or sulfur atom or

wherein $R_6$ is hydrogen, alkyl, aryl, arylalkyl, or arylalkyl; and $R_1$ and $R_2$ may be the same or different and are hydrogen, linear or branched $C_{1-10}$ alkyl, aryl, alkylaryl, arylalkyl, hydroxycarbonyl, alkoxycarbonyl or amide radical, or $R_1$ and $R_2$ together form a closed ring structure, with $R_1$ and $R_2$ together forming a chain selected from the group consisting of an optionally substituted $C_{3-4}$ alkylene radical and O—T—O wherein T is an optionally substituted $C_{2-3}$ alkylene radical, and n is 10 to 5000.

In accordance with a second embodiment of the present invention, there is provided a heterocyclic macromer II having the formula:

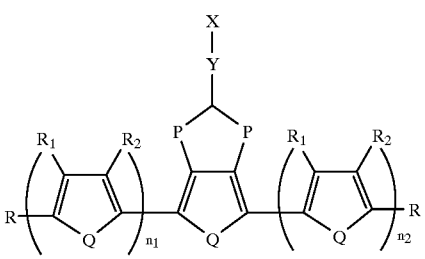

wherein Q is an oxygen or sulfur atom or

wherein $R_6$ is hydrogen, alkyl, aryl, alkylaryl or arylalkyl; and $R_1$ and $R_2$ may be the same or different and are hydrogen, linear or branched $C_{1-10}$ alkyl, aryl, alkylaryl, arylalkyl, hydroxycarbonyl, alkoxycarbonyl, or amide radical, or $R_1$ and $R_2$ together form a closed ring structure, with $R_1$ and $R_2$ together forming a chain selected from the group consisting of an optionally substituted $C_{3-4}$ alkylene radical and O—T—O wherein T is an optionally substituted $C_{2-3}$ alkylene radical, P is selected from the group consisting of $C_{12}$ alkylene, an oxygen atom or a —$CH_2$—O— linkage, R is a terminal group, X is a moiety copolymerizable with monomers A and B or is capable of attachment to copolymerized monomers A and B, Y is a divalent linking group, $n_1$ or $n_2$ each range from 0 to 5000 and $n_1+n_2$ ranges from 10 to 5000.

DETAILED DESCRIPTION OF THE INVENTION

In one embodiment, the heterocyclic macromer of the present invention is defined by the formula X—(Y)$_m$—Z—R, wherein X is a moiety copolymerizable with monomers A and B or is capable of attachment to copolymerized monomers A and B, R is a terminal group, Y is a divalent linking group and m is 0 or 1. The Z moiety comprises the heterocyclic portion of the graft moiety.

More specifically, the X moiety is an unsaturated polymerizable moiety the composition of which is not critical. The X moiety may be, for example, when intended to be copolymerizable with monomers A and B, simply a vinyl group of the formula $CHR^3=CR^4$—where $R^3$ is hydrogen or COOH and $R^4$ is hydrogen or alkyl such as methyl. Other exemplary X moieties include but are not limited to methacryloyl, maleoyl, itaconoyl, crotonoyl, unsaturated urethane moiety, methacrylamido and moieties of the formula $CH_2=CHCH_2O$—.

The X moiety may comprise an amine or alcohol moiety (such as a monohydroxyl or monoamine moiety) which permits attachment of the macromer to a suitable functionality on previously-polymerized monomers A and B. For instance, the hydroxyl moiety can serve as a terminal reactive group by reaction with suitable moieties on the polymer backbone resulting from the use of monomers such as isocyanate-substituted (meth)acrylic acid, (meth)acrylic acid anhydride, etc.

The divalent linking group Y may be selected from a variety of acceptable moieties, with a preferred divalent linking group Y being

or a linking group which incorporates such a moiety.

Additional Y linking groups which may be employed in connection with the present invention include but are not limited to the following moieties:

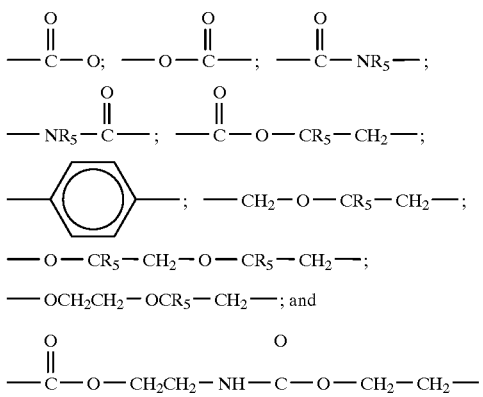

where $R^5$ is hydrogen, alkyl or phenyl.

Divalent macromonomeric moieties may also be employed as the linking group. For instance, exemplary divalent macromeric moieties include (but are not limited to) a polypropylene or polyethylene oxide radical, a polyethyloxazoline radical such as a radical of poly(2-ethyl-2-oxazoline), polyacrylic acid radical, polyvinyl alcohol radical, polyvinylpyrrolidone radical, polyvinyl caprolactam radical, polymethylvinyl ether radical or mixtures thereof.

The presence of the Y linking group is optional in the event the Z moiety includes a functionality which enables the Z moiety to react with the X moiety.

With regard to the Z moiety, Z may in one embodiment be defined as the heterocyclic moiety

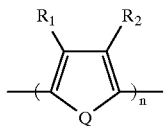

wherein Q is an oxygen or sulfur atom or

wherein $R_6$ is hydrogen, alkyl, aryl, alkylaryl or arylalkyl; and $R_1$ and $R_2$ may be the same or different and are hydrogen, linear or branched alkyl, aryl, alkylaryl, arylalkyl, hydroxycarbonyl, alkoxycarbonyl, or amide radical, or $R_1$ and $R_2$ together form a closed ring structure, with $R_1$ and $R_2$ together forming a chain selected from the group consisting of an optionally substituted $C_{3-4}$ alkylene radical and —O—T—O— wherein T is an optionally substituted $C_{2-3}$ alkylene radical, and n ranges from 10 to 5000.

In a preferred embodiment, $R_1$ and $R_2$ are both hydrogen and Q is a sulfur atom.

In an alternative embodiment, the heterocyclic macromer X—Y—Z—R may be defined by the formula:

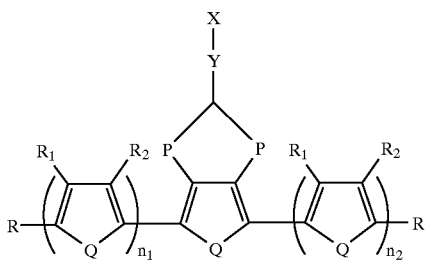

wherein X, Q, R, $R_1$ and $R_2$ are as defined above, P is selected from the group consisting of $C_{1-2}$ alkylene, an oxygen atom or a —$CH_2$—O— linkage, Y is a divalent linking group, n, and $n_2$ each range from 0 to 5000 and $n_1+n_2$ is 10 to 5000.

In the above discussion, alkyl and alkoxy radicals have from 1 to 10 carbon atoms. The alkylene radicals may be substituted with $C_{1-10}$ alkyl or alkoxy radicals.

In a first embodiment, the heterocyclic moiety (macromer I) defined by the formula X—$(Y)_m$—Z—R may be prepared by the following synthesis (exemplified by use of the sulfur heterocycle):

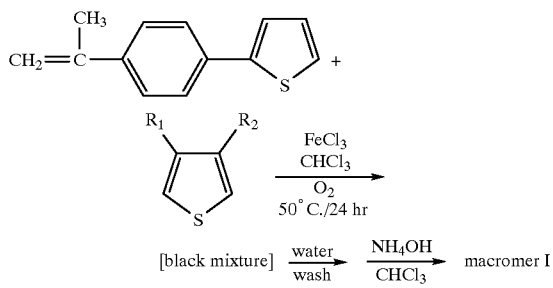

(followed by removal of $CHCl_3$ and MeOH extraction)

The heterocyclic macromeric moiety II of the second embodiment may be prepared in a similar manner whereby the following compound 2 is substituted for compound 1 of the above reaction scheme:

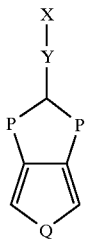

where X, Y and Q are as defined previously. Also, mixtures of compounds 1 and 2 may be employed in the reaction mixture.

In all instances, the R terminal group is preferably hydrogen, $C_{1-5}$ alkyl or phenyl. It is, however, within the scope of the present invention for the R terminal group to contain a reactive group which permits subsequent crosslinking (either ionic or covalent); i.e., the R terminal group may be either mono- or difunctional.

The novel macromers of the present invention may be used with advantage in the production of a variety of graft copolymers. The presence of the macromer in the copolymer serves to impart electrical conductivity to the copolymer.

By way of example, the macromers of the present invention may be used to produce a graft copolymer comprised of copolymerized monomers A and B wherein the macromer of the present invention is a graft polymeric moiety C attached thereto.

By way of example, monomer A may be a monomeric acrylic or methacrylic acid ester of a non-tertiary alcohol having from 1 to 30 carbon atoms with the average number of carbon atoms possessed by the acrylic or methacrylic acid esters present as the A monomer(s) being in the range of about 4 to 15.

Exemplary A monomers include but are not limited to esters of acrylic acid or methacrylic acid with non-tertiary alcohols such as 1-butanol, 1-pentanol, 2-pentanol, 3-pentanol, 2-methyl-1-butanol, 1-methyl-1-pentanol, 2-methyl-1-pentanol, 3-methyl-1-pentanol, 2-ethyl-1-butanol, 3,5,5-trimethyl-1-hexanol, 3-heptanol, 2-octanol, 1-decanol, 1-dodecanol, etc., as well as mixtures thereof. Such monomers are known to those skilled in the art. Exemplary A monomers include but are not limited to methyl (meth)acrylate, ethyl (meth)acrylate, propyl (meth) acrylate, stearyl (meth)acrylate, lauryl (meth)acrylate, isooctyl (meth)acrylate, and isobornyl (meth)acrylate.

As discussed above, optionally one or more polymerizable B monomers may be incorporated in the copolymer which B monomer(s) is copolymerizable with the A monomer. If the $T_g$ of the B monomer present is equal to or greater than 20° C., then less than 20% by weight of the B monomer should be present if it is desired that the copolymer exhibit pressure sensitive adhesive properties.

By way of example, optional B monomers may include vinyl monomers having at least one nitrogen atom. Such monomers (each of which exhibit a $T_g$ of >20° C.) include but are not limited to N-mono-substituted acrylamides such as acrylamide, methacrylamide, N-methylacrylamide, N-ethylacrylamide, N-methylolacrylamide, N-hydroxyethylacrylamide, and diacetone acrylamide; N,N-disubstituted acrylamides such as N,N-dimethylacrylamide, N,N-diethylacrylamide, N-ethyl—N—aminoethyl acrylamide, N-ethyl—N—hydroxyethylacrylamide, N,N-dimethylolacrylamide, and N,N-dihydroxyethylacrylamide, etc.

Other optional B monomers may include, for example, various vinyl monomers such as acrylic and methacrylic acid, itaconic acid, methoxyethyl acrylate or methacrylate, ethyoxyethyl acrylate or methacrylate, acrylonitrile, methacrylonitrile, glycerol acrylate or methacrylate, hydroxyethyl methacrylate, hydroxypropyl methacrylate, vinyl pyrrolidone and vinyl caprolactam (each of which also exhibit a $T_g$ of >20° C.).

The copolymer may optionally also include a water-soluble or water-dispersible graft polymeric moiety D. The macromer D forms polymeric sidechains on the graft copolymer. The macromer D is hydrophilic by nature (i.e., the macromer is water-soluble or water-dispersible).

The macromer D may be represented by the formula X—$(Y)_p$—Z—R wherein X is a moiety copolymerizable with monomers A and B or, in the alternative, capable of attachment to polymerized monomers A and B, Y is a divalent linking group, Z is a water-soluble or water-dispersible homo- or polymeric moiety essentially unreactive at copolymerization conditions, R is a terminal group, and p is 0 or 1.

The X and Y moieties may be selected using the same criteria discussed above in connection with the X and Y moieties present in the heterocyclic graft polymeric moiety.

By way of example, the Z moiety of macromer D may be selected from the group consisting of (but not limited to) a polypropylene or polyethylene oxide radical, a polyethyloxazoline radical such as a radical of poly(2-ethyl-2-oxazoline), polyacrylic acid radical, polyvinyl alcohol radical, polyvinylpyrrolidone radical, polyvinyl caprolactam radical, polymethylvinyl ether radical or mixtures thereof. Exemplary D macromers formed from such radicals include but are not limited to ethoxylated or propoxylated hydroxy ($C_{1-5}$)alkyl meth(acrylate) and polymethylvinyl ether mono (meth)acrylate. The molecular weight of the macromer D is not critical but will generally range from about 300 to about 50,000, and preferably from about 300 to 3,000.

The hydrophilic macromer D is more preferably represented by the formula:

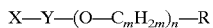

wherein X and Y are as defined above and R represents a terminal group; and in which m is an integer of from 2 to 6 and n is an integer of from 5 to 300. More specifically, macromer D is advantageously an ethoxylated or propoxylated hydroxy($C_{1-5}$)alkyl eh(meth)acrylate represented by the formula:

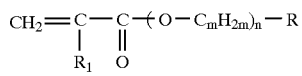

wherein $R_1$ is hydrogen or $C_{1-5}$ alkyl and R is a terminal group. Preferably, m is 2 or 3 and n is 5 to 30, and R is OH or $C_{1-5}$ alkyl.

The Z moiety is preferably comprised solely of one or more hydrophilic monomer radicals to ensure that the resulting macromer is water-soluble or water-dispersible. However, the Z moiety may also be a copolymer of hydrophilic and hydrophobic monomers, with any copolymerized hydrophobic portion being present in an amount insufficient to render the resulting macromer water-insoluble or non-water-dispersible. Desirably, any non-hydrophilic portion employed in such a copolymer is present in an amount of less than 50 percent by weight based on the weight of the macromer, and preferably less than 30 percent by weight.

The macromer D may employ a variety of terminal groups R. While the terminal group may typically be OH or $C_{1-5}$ alkyl, it may be desirable to select a terminal group based on the functional character of the terminal group. For instance, suitable terminal groups include but are not limited to (1) acid/ionic groups such as carboxyl, phosphate or sulfate groups, (2) hydrophobic groups such as $C_{1-5}$ alkyl, phenyl or substituted phenyl, and (3) hydrophilic groups such as hydroxyl or amine groups.

Depending upon the terminal group employed, ionic end groups may be used to provide pH-dependent solubility characteristics for the copolymer. Hydrophobic terminal groups may be used to reduce the water solubility of the copolymer. Other physical properties or characteristics of the copolymer may be modified by selection of suitable terminal groups. For example, ionic terminal groups may be used to provide a desired degree of cross-linking; for example, by neutralizing acid moieties with metal hydroxides.

The copolymer may be covalently or ionically crosslinked in a conventional manner. Suitable covalent crosslinking agents are well-known in the art. Covalent crosslinking may be achieved by incorporating into the polymerization mixture (for internal crosslinking) a polyfunctional ethylenically unsaturated compound in an amount sufficient to provide the desired crosslinking. External crosslinking agents may also be employed by admixture to the copolymer polymerization product.

Exemplary internal crosslinking agents suitable for addition to the reaction mixture include but are not limited to di- or tri-esters of (meth)acrylic acid, di- or poly-alkylene glycol (meth)acrylates, alkylene bis(meth)acrylamides and n-(isobutoxymethyl)acrylamide.

Exemplary external crosslinking agents which may be added to the polymerization product to provide the desired crosslinking include but are not limited to aziridines, titanates, melamine resins, etc.

Generally, the crosslinking agent, if employed, is added to the reaction mixture or to the polymerization product in an amount of from 0.02 to about 2 percent by weight, preferably from about 0.05 to 1 percent by weight.

The graft copolymer may be ionically-crosslinked in a conventional manner. See, for example, the teachings of U.S. Pat. Nos. 3,264,272; 3,969,434; and 4,002,581 each herein incorporated by reference in their entirety.

The desired ionic crosslinking can occur by providing on at least a portion of the monomers A and B and/or the graft moieties C and D functional groups which are capable of being neutralized by a mono-, di- or trivalent metal ion. Exemplary functional groups are selected from the group consisting of carboxyl, sulfate, phosphate, anhydride and mixtures thereof. For example, at least one of the copolymerizable B monomers may comprise an ionically-crosslinkable monomer such as an alpha, beta-ethylenically unsaturated carboxylic acid group having from 3–8 carbon atoms, such as acrylic acid, methacrylic acid, ethacrylic acid, itaconic acid, maleic acid, fumaric acid, and dicarboxylic acids. Alpha,beta-monoethylenically unsaturated anhydrides of carboxylic acid such as maleic anhydride can also be employed. For example, from about 3 to 10 percent by weight of the total reactants A, B, C and D may comprise acrylic or (meth)acrylic acid to provide the desired functionalities.

Desirably, the D macromer may be rendered ionically-crosslinkable by incorporation of an acidic/ionic terminal group such as carboxyl, sulfate, phosphate, anhydride or mixtures thereof.

As discussed in U.S. Pat. No. 3,264,272, the ionically-crosslinked graft copolymer may be produced by reaction of the copolymer with an ionizable metal compound in order to neutralize the appropriate functionalities (e.g., acid functionalities) on either the base monomers or on the macromer. Preferably, from about 2 to about 50 weight percent of the base monomers or the macromer contain functionalities which may be neutralized by reaction with an ionizable metal compound.

Metal ions which may be employed in the formation of the ionically-crosslinked graft copolymer include but are not limited by to mono-, di- and trivalent ions of the metals of Groups I, II, III, IV and VIII. Suitable monovalent metal ions include sodium, potassium, lithium, cesium, silver, mercury and copper. Suitable divalent metal ions include beryllium, magnesium, calcium, strontium, berium, copper, cadmium, mercury, tin, lead, iron, cobalt, nickel and zinc. Suitable trivalent metal ions include aluminum, chromium, iron and yttrium. The preferred metal ions are alkali metal ions.

The ionic crosslinking reaction (i.e., the neutralization of the appropriate neutralizable functionalities) may be carried out by blending the graft copolymer with a solution of the crosslinking metal compounds in an amount sufficient to neutralize the neutralizable functionalities to the desired extent. Preferred metal compounds for use in providing the necessary neutralization include but are not limited to alkali and alkaline earth metal hydroxides. Also suitable are alkali metal salts or alkaline earth metal salts based on an organic acid, such as sodium acetate, calcium acetate, magnesium acetate, zinc formate, and zinc acetate.

Preferably, in the exemplified copolymer containing the macromer C of the present invention, the A monomer is present in an amount of from 30 to 70 percent by weight, the B monomer is present in an amount of from 3 to 30 percent by weight, the C graft macromeric moiety is present in an amount of from 20 to 60 percent by weight, and the D macromer is present in an amount ranging from 0 to 40 percent by weight, based on the total weight of the respective components A, B, C and D in the copolymer. If it is desired to produce a copolymer exhibiting pressure sensitive adhesive properties, the A monomer is preferably present in an amount of from 30 to 75 percent by weight, the B monomer is hydrophilic and is preferably present in an amount of from 3 to 15 percent by weight, the graft macromeric moiety C is preferably present in an amount of from 20 to 60 percent by weight, and the macromer D is preferably present in an amount of from 15 to 40 percent by weight.

It is also possible to admix a tackifier or plasticizer with the graft copolymer to provide adhesive tack. Exemplary tackifiers include polyethylene glycol, polypropylene glycol, and suitable polyoxyethylene-based compounds. Suitable polyoxyethylene-based tackifiers are disclosed at column 6 of U.S. Pat. No. 4,413,080, herein incorporated by reference in its entirety. Such tackifiers, if present, may be employed in an amount of up to about 50 percent by weight, based on the total weight of the composition.

The graft moiety C and macromer D may be attached to the polymer backbone by conventional techniques such as (1) copolymerization with the respective monomers of the backbone polymer or (2) attachment to a preformed backbone polymer via a suitable functional group subsequent to formation of same by copolymerization of monomers A and B.

With regard to technique (1) which comprises the preferred technique, the graft copolymer of the present invention may be formed from copolymerized components A, B, C and optionally D, wherein (1) monomer A is a monomeric acrylic or methacrylic acid ester of a non-tertiary alcohol, said alcohol having from 1 to 30 carbon atoms with the average number of carbon atoms being in the range of about 4 to 15, (2) monomer B is a monomer copolymerizable with said monomer A, and (3) graft moieties C and optionally D having the general formula X—Y—Z—R as defined above.

The graft moieties C and D may be prepared and copolymerized with one or more A and B monomers which form the backbone polymer such as acrylic acid, acrylamide, methacrylic acid, methacrylamide and alkyl acrylates where the alkyl groups contain from 1 to 14 carbon atoms (e.g., methyl, ethyl, propyl, isopropyl, butyl, amyl, hexyl, 2-ethylhexyl and other octyl, nonyl and decyl acrylates). See, for instance, the disclosure of U.S. Pat. No. 3,786,116, incorporated by reference in its entirety, in this regard.

Typical copolymerization techniques include but are not limited to conventional free radical initiated copolymerization techniques (1) in the presence of a solvent or (2) in the absence of a solvent by means of conventional syrup UV curing techniques.

When polymerized in the presence of a solvent suitable copolymerization temperatures range from about 20° C. to 150° C. for periods of time of from 2 to 24 hours until the desired degree of conversion occurs. Upon completion of the polymerization process, the solvent is removed and a graft copolymer results.

Depending upon the properties imparted to the backbone polymer as a result of the molecular weight of the particular graft employed, the resulting graft copolymer may need to be used in solution or emulsion form. That is, if the molecular weight of the graft is sufficiently high, the resultant graft copolymer may be applied to a backing material or substrate in emulsion or solution form, with the water or solvent being removed upon application to the substrate.

The coated copolymer may be treated with a suitable material to yield a copolymer having a highly conductive doped state in a conventional manner. For example, the copolymer may be dipped in a 3 mg/ml solution of ferric chloride for a period of time sufficient to yield a conductive doped copolymer.

For instance, exemplary backing materials include but are not limited to flexible or inflexible backing materials conventionally employed in the area of pressure sensitive adhesives such as creped paper, kraft paper, fabrics (knits, non-wovens, wovens), foil and synthetic polymer films such as polyethylene, polypropylene, polyvinyl chloride, poly (ethylene terephthalate) and cellulose acetate, as well as glass, ceramics, metallized polymeric films and other compatible sheet materials.

Such materials may be coated in any conventional manner with the adhesive composition of the present invention, such as by roll coating, spray coating, extrusion coating, co-extrusion coating, hot melt coating by use of conventional coating devices. When appropriate, the composition of the present invention may be applied as a solution and the solvent subsequently removed to leave a tacky adhesive residue on the backing material.

The coated backing material may take many forms, such as tapes, patches, strips, biomedical electrodes, etc., with the choice and form of backing material being ultimately determined by the end use contemplated.

What is claimed is:

1. A heterocyclic macromer defined by the formula

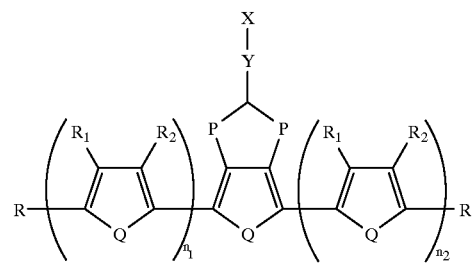

wherein Q is an oxygen or sulfur atom or

wherein $R_6$ is hydrogen, alkyl, aryl, alkylaryl or arylalkyl; and $R_1$ and $R_2$ may be the same or different and are hydrogen, linear or branched $C_{1-10}$ alkyl, aryl, alkylaryl, arylalkyl, hydroxycarbonyl, alkoxycarbonyl, or amide radical, or $R_1$ and $R_2$ together form a closed ring structure, with $R_1$ and $R_2$ together forming a chain selected from the group consisting of an optionally substituted $C_{3-4}$ alkylene radical and —O—T—O— wherein T is an optionally substituted $C_{2-3}$ alkylene radical, P is selected from the group consisting of $C_{12}$ alkylene, an oxygen atom or a —CH$_2$—

O— linkage, R is a terminal group, X is an unsaturated polymerizable moiety, Y is a divalent linking group, $n_1$ and $n_2$ each range from 0 to 5000 and $n_1+n_2$ is 10 to 5000.

2. The macromer of claim 1 wherein X is a (meth)acrylate moiety.

3. The macromer of claim 2 wherein R is selected from the group consisting of hydrogen, $C_{1-5}$ alkyl or phenyl.

4. The macromer of claim 1 wherein Q is an oxygen atom.

5. The macromer of claim 1 wherein Q is a sulfur atom.

6. The macromer of claim 1 wherein Q is —NH—.

7. The macromer of claim 1 wherein P is an oxygen atom.

8. The macromer of claim 1 wherein P is a —CH$_2$— linkage.

9. A heterocyclic macromer defined by the formula X—(Y)$_m$—Z—R, wherein X is an unsaturated polymerizable moiety, Y is a divalent linking group, R is a terminal group, m is 0 or 1, and Z is the moiety

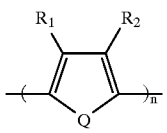

wherein Q is an oxygen or sulfur atom or

wherein $R_6$ is hydrogen, alkyl, aryl, alkylaryl or arylalkyl; and $R_1$ and $R_2$ together form a closed ring structure, with $R_1$ and $R_2$ together forming a chain selected from the group consisting of an optionally substituted $C_{3-4}$ alkylene radical and —O—T—O— wherein T is an optionally substituted $C_{2-3}$ alkylene radical, and n ranges from 10 to 5000.

10. The macromer of claim 9 wherein X is a (meth)acrylate moiety.

11. The macromer of claim 9 wherein R is selected from the group consisting of hydrogen, $C_{1-5}$ alkyl or phenyl.

12. The macromer of claim 9 wherein m is 1.

13. The macromer of claim 9 wherein $R_1$ and $R_2$ together form the chain —O—(CH$_2$)$_2$—O—.

14. The macromer of claim 9 wherein Q is an oxygen atom.

15. The macromer of claim 9 wherein Q is a sulfur atom.

16. The macromer of claim 9 wherein Q is —NH—.

17. The macromer of claim 9 wherein $R_1$ and $R_2$ together form an optionally substituted —O—(CH$_2$)$_2$—O— or —O—(CH$_2$)$_3$—O— chain.

18. A heterocyclic macromer defined by the formula X—(Y)$_m$—Z—R, wherein X is an unsaturated polymerizable moiety, Y is a divalent linking group, R is a terminal group, m is 1, and Z is the moiety

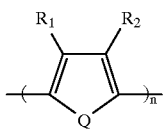

wherein Q is an oxygen or sulfur atom or

wherein $R_6$ is hydrogen, alkyl, aryl, alkylaryl or arylalkyl; and $R_1$ and $R_2$ may be the same or different and are hydrogen, linear or branched $C_{1-10}$ alkyl, aryl, alkylaryl, arylalkyl, hydroxycarbonyl, alkoxycarbonyl, or amide radical, or $R_1$ and $R_2$ together form a closed ring structure, with $R_1$ and $R_2$ together forming a chain selected from the group consisting of an optionally substituted $C_{3-4}$ alkylene radical and —O—T—O— wherein T is an optionally substituted $C_{2-3}$ alkylene radical, and n ranges from 10 to 5000, and wherein Y is selected from the group consisting of

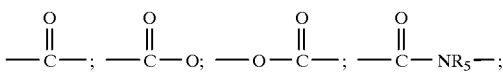

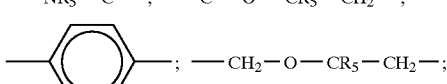

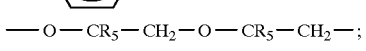

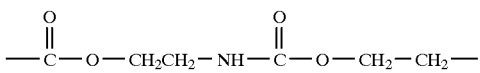

where $R^5$ is hydrogen, alkyl or phenyl.

19. The macromer of claim 18 wherein X is a (meth)acrylate moiety.

20. The macromer of claim 18 wherein R is selected from the group consisting of hydrogen, $C_{1-5}$ alkyl or phenyl.

21. The macromer of claim 18 wherein $R_1$ and $R_2$ are each hydrogen.

22. The macromer of claim 18 wherein $R_1$ and $R_2$ together form the chain —O—(CH$_2$)$_2$—O—.

23. The macromer of claim 18 wherein Q is an oxygen atom.

24. The macromer of claim 18 wherein Q is a sulfur atom.

25. The macromer of claim 18 wherein Q is —NH—.

26. The macromer of claim 18 wherein $R_1$ and $R_2$ together form an optionally substituted $C_{3-4}$ alkylene chain.

27. The macromer of claim 18 wherein $R_1$ and $R_2$ together form an optionally substituted —O—(CH$_2$)$_2$—O— or —O—(CH$_2$)$_3$—O— chain.

* * * * *